US008565707B2

(12) United States Patent
Kavousian et al.

(10) Patent No.: US 8,565,707 B2
(45) Date of Patent: Oct. 22, 2013

(54) CANCELLATION OF SPECTRAL IMAGES IN COMMUNICATION DEVICES

(75) Inventors: Amirpouya Kavousian, San Jose, CA (US); David K. Su, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 13/272,872

(22) Filed: Oct. 13, 2011

(65) Prior Publication Data

US 2013/0095776 A1 Apr. 18, 2013

(51) Int. Cl.
*H04B 1/10* (2006.01)
(52) U.S. Cl.
USPC .......................................... 455/285; 455/302
(58) Field of Classification Search
USPC .................. 341/144, 126; 455/285, 302, 296, 455/278.1, 501, 63.1, 114.2, 114.3
See application file for complete search history.

(56) References Cited

U.S. PATENT DOCUMENTS

| 1,686,792 | A | 10/1928 | Black | |
|---|---|---|---|---|
| 6,806,820 | B1 * | 10/2004 | Dhalla et al. | 341/144 |
| 7,023,371 | B2 * | 4/2006 | Schoner | 341/144 |
| 7,508,451 | B2 | 3/2009 | Sheng et al. | |
| 2006/0291549 | A1 * | 12/2006 | Seppinen et al. | 375/227 |
| 2009/0054026 | A1 * | 2/2009 | Miller et al. | 455/266 |
| 2009/0111420 | A1 * | 4/2009 | Tasic et al. | 455/334 |
| 2009/0185649 | A1 * | 7/2009 | Webster et al. | 375/346 |

FOREIGN PATENT DOCUMENTS

WO 2013055376 4/2013

OTHER PUBLICATIONS

Kavousian, Amirpouya et al., "A Digitally Modulated Polar CMOS Power Amplifier With a 20-MHz Channel Bandwidth", *IEEE Journal of Solid-State Circuits*, vol. 43, No. 10, Oct. 2008 , 8 pages.
International Search Report and Written Opinion—PCT/US2011/058686—ISA/EPO—Feb. 7, 2012.

\* cited by examiner

*Primary Examiner* — Sonny Trinh
(74) *Attorney, Agent, or Firm* — DeLizio Gilliam, PLLC

(57) ABSTRACT

Digital-to-analog conversion in a communication device typically results in superimposed spectral images in the frequency spectrum of the analog waveform. These superimposed spectral images can distort the analog waveform and potentially violate the spectral mask and the constraints on out-of-band emissions set by the FCC. The communication device can be configured to implement a spectral image cancellation unit with feed-forward architecture to minimize the spectral images in the frequency spectrum of the analog waveform. The spectral image cancellation unit can generate a spectral image error signal comprising the spectral images at one or more spectral image frequencies. The spectral image cancellation unit can then subtract the spectral image error signal from the analog waveform to reduce spectral image components of the analog waveform and to yield an output signal for transmission.

19 Claims, 7 Drawing Sheets

CANCELLATION OF SPECTRAL IMAGES IN COMMUNICATION DEVICES

BACKGROUND

Embodiments of the inventive subject matter generally relate to the field of signal processing and, more particularly, to cancellation of spectral images in communication devices.

Discrete-time to continuous-time conversion of a baseband signal (i.e., digital-to-analog conversion) typically results in unwanted spurious signals being generated (in addition to the desired signal) at frequencies related to the baseband signal frequency and the sampling frequency associated with the digital-to-analog conversion). These unwanted spurious signals generated because of the digital-to-analog conversion are referred to as "spectral images." For example, if a 20 MHz analog signal is sampled at 100 MHz, the spectral images may be generated at 80 MHz, 120 MHz, 180 MHz, and so on. The spectral images can distort the frequency spectrum of the desired signal.

SUMMARY

Various embodiments for cancellation of spectral images in communication devices are disclosed. In one embodiment, an apparatus for cancellation of spectral images comprises a digital-to-analog conversion unit and a spectral image cancellation unit coupled with the digital-to-analog conversion unit. The digital-to-analog conversion unit is operable to generate a radio frequency (RF) analog composite signal comprising an RF transmission signal component and a superimposed RF spectral image signal component. The spectral image cancellation unit is operable to generate a baseband analog composite signal comprising a baseband transmission signal component and a superimposed baseband spectral image signal component. The spectral image cancellation unit is operable to filter the baseband analog composite signal to yield a baseband spectral image signal. The spectral image cancellation unit is further operable to up-convert the baseband spectral image signal in accordance with a predetermined carrier signal to yield an RF spectral image signal. The spectral image cancellation unit is operable to subtract the RF analog composite signal generated by the digital-to-analog conversion unit and the RF spectral image signal to reduce the superimposed RF spectral image signal component associated with the RF analog composite signal and generate an output RF transmission signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
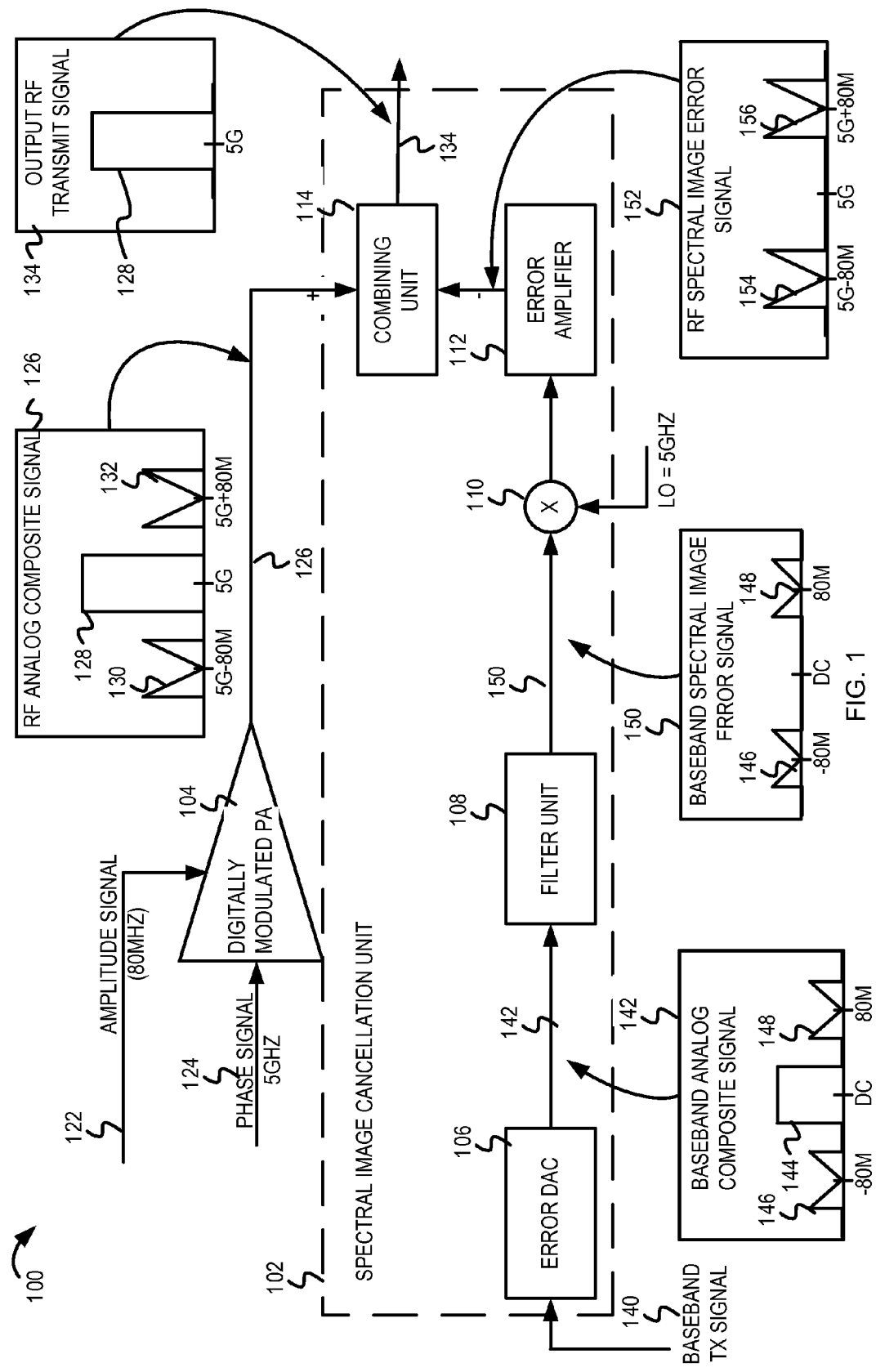
FIG. 1 is an example block diagram illustrating one embodiment of a mechanism for analog active spectral image cancellation.

The description that follows includes exemplary systems, circuits, devices, methods, techniques, instruction sequences, and computer program products that embody techniques of the present inventive subject matter. However, it is understood that the described embodiments may be practiced without these specific details. For instance, although examples refer to techniques for spectral image cancellation in digital-to-analog conversion devices (e.g., digitally modulated power amplifiers and digital-to-analog converters (DACs)), embodiments are not so limited. In other embodiments, the techniques for spectral image cancellation can be extended for correcting other non-linearities (e.g., spur cancellation techniques). In other instances, well-known circuit components, instruction instances, protocols, structures, and techniques have not been shown in detail in order not to obfuscate the description.

A transmitting device typically converts digital data into an analog waveform for transmission via a communication medium. However, conversion of the digital data into the analog waveform (e.g., by a digitally modulated power amplifier, by a digital-to-analog converter (DAC), etc.) creates superimposed spectral images in the frequency spectrum of the analog waveform, which can distort the analog waveform. In some implementations, the amplitude of the spectral images may be high and may violate the spectral mask and the constraints on out-of-band emissions set by the Federal Communications Commission (FCC). Therefore, the spectral images may need to be suppressed (or minimized) for compliance with the spectral mask and the constraints on out-of-band emissions. In some implementations, the spectral images can be reduced by increasing the effective sampling rate of the digital data (i.e., by oversampling) to try to ensure that the spectral images are sufficiently separated (in frequency) from the desired signal and ensure that the spectral images are attenuated below the spectral mask imposed by the FCC. However, oversampling may result in an increase in power consumption, may require additional bandwidth, and may require high-speed processing components. Furthermore, because the spectral images are close to the frequency around which the desired signal is centered, techniques for spectral image cancellation based on filtering can result in signal loss and can reduce the overall efficiency of the transmitting device.

A spectral image cancellation unit with a feed-forward architecture can be implemented on the transmitting device to actively cancel (or to minimize) the spectral images in the frequency spectrum of the analog waveform generated at the output of the digital-to-analog conversion device. The spectral image cancellation unit can generate a spectral image error signal comprising the spectral images at one or more spectral image frequencies. The spectral image cancellation unit can then combine the spectral image error signal with the analog waveform (that comprises the desired transmit signal component and superimposed spectral image components) to cancel/minimize the spectral image components. Such a technique for active cancellation of the spectral images can ensure that the amplitude of the spectral images in the transmitted signal complies with the spectral mask and constraints on out-of-band emissions set by the FCC, and can also improve the efficiency and performance of the transmitting device.

FIG. 1 is an example block diagram illustrating one embodiment of a mechanism for analog active spectral image cancellation. FIG. 1 depicts a communication device 100 comprising a spectral image cancellation unit 102 and a digitally modulated power amplifier (PA) 104. The spectral image cancellation unit 102 comprises an error digital-to-analog converter (DAC) 106, a filter unit 108, a mixer unit 110, an error amplifier 112, and a combining unit 114. In one implementation, as depicted in FIG. 1, the error DAC 106 is coupled to the filter unit 108; the filter unit 108 is coupled to the mixer unit 110; and the mixer unit 110 is coupled to the error amplifier 112. The output of the digitally modulated PA 104 and the output of the error amplifier 112 are provided to the combining unit 114.

Although not depicted in FIG. 1, the digitally modulated PA 104 can be part of a signal processing unit comprising one or more other processing components to generate the RF analog composite signal 126. In one implementation, the signal processing unit can comprise a Cartesian to polar conversion unit that receives, as an input, a baseband digital input signal that is to be transmitted. In one implementation, a Cartesian representation (e.g., in phase (I)-signal components and quadrature (Q)-signal components) of the baseband digital input signal are provided to the Cartesian to polar conversion unit which converts the Cartesian representation of the baseband digital input signal into a corresponding polar representation (e.g., an amplitude signal 122 and a phase signal 124) of the baseband digital input signal. The phase signal 124 can be converted into a constant-envelope RF signal so that the amplitude signal 122 is at the baseband frequency (e.g., 80 MHz in the example of FIG. 1), while the phase signal 124 is at the RF frequency (e.g., 5 GHz in the example of FIG. 1). The amplitude signal 122 and the phase signal 124 are provided as inputs to the digitally modulated PA 104, which performs a digital-to-analog conversion of the amplitude signal 122, modulates the amplitude signal 122 onto the phase signal 124, and also provides constant-envelope amplification in the RF phase domain. However, as described above, digital-to-analog conversion of the amplitude signal 122 by the digitally modulated PA 104 results in an RF analog composite signal 126 comprising an RF transmission signal component 128 (i.e., the desired signal component) and RF spectral image signal components 130 and 132 (i.e., the unwanted spectral images). As depicted in the example of FIG. 1, when the phase signal 124 is at a frequency of 5 GHz (i.e., the carrier frequency is 5 GHz) and the amplitude signal 122 is at a frequency of 80 MHz (i.e., the baseband frequency is 80 MHz), the RF analog composite signal 126 comprises the RF transmission signal component 128 centered at 5 GHz, the RF spectral image signal component 130 centered at 4.920 GHz (i.e., at 5 GHz−80 MHz), and the RF spectral image signal component 132 centered at 5.080 GHz (i.e., at 5 GHz+80 MHz).

To minimize the RF spectral image signal components 130 and 132 in the RF analog composite signal 126, the baseband digital input signal is also provided to the spectral image cancellation unit 102 (as shown in FIG. 1). The error DAC 106 of the spectral image cancellation unit 102 converts the baseband digital input signal 140 into a baseband analog composite signal 142 comprising a baseband transmission signal component 144 (i.e., the desired signal component at baseband) and baseband spectral image signal components 146 and 148 (i.e., the unwanted spectral images at baseband). Because the input to the error DAC 106 is a baseband signal (e.g., at 80 MHz), the baseband analog composite signal 142 comprises the baseband transmission signal component 144 centered at DC (i.e., 0 Hz), the baseband spectral image signal component 146 centered at −80 MHz (i.e., at 0 Hz−80 MHz), and the baseband spectral image signal component 148 centered at 80 MHz (i.e., at 0 Hz+80 MHz). The baseband analog composite signal 142 is provided to the filter unit 108. In one implementation, the filter unit 108 can comprise a high pass filter (HPF). The filter unit 108 can filter out the baseband transmission signal component 144 to yield a baseband spectral image error signal 150 comprising the baseband spectral image signal components 146 and 148 centered at −80 MHz and 80 MHz, respectively. The mixer unit 110 can up-convert the baseband spectral image error signal 150 to the local oscillator frequency (5 GHz in the example of FIG. 1), and the resultant RF signal is amplified by the error amplifier 112 to yield the RF spectral image error signal 152. In the example of FIG. 1, the local oscillator frequency is 5 GHz and therefore the RF spectral image error signal 152 comprises the spectral images 154 and 156 centered at 4.920 GHz (i.e., at 5 GHz−80 MHz) and 5.080 GHz (i.e., at 5 GHz+80 MHz), respectively. Furthermore, the amplification factor of the error amplifier 112 can be selected such that the amplitude of the spectral images 154 and 156 in the RF spectral image error signal 152 is approximately equal to the amplitude of the spectral images 130 and 132 in the RF analog composite signal 126.

The RF analog composite signal 126 and the RF spectral image error signal 152 are provided to the combining unit 114. The combining unit 114 subtracts the RF spectral image error signal 152 from the RF analog composite signal 126 to minimize the spectral image signal components 130 and 132 and to yield the output RF transmit signal 134. In one example, as depicted in FIG. 1, the output RF transmit signal 134 may comprise the RF transmission signal component 128 (i.e., the desired signal component) centered at 5 GHz and may not comprise the spectral image signal components 130 and 132. However, in other examples, the output RF transmit signal 134 may comprise the RF transmission signal component 128 and highly attenuated spectral image signal components 130 and 132. In other words, the amplitude of the spectral image signal components 130 and 132 in the output RF transmit signal 134 may be significantly lower than the constraints set by the FCC. The output RF transmit signal 134 at the output of the combining unit 114 can be further amplified (if desired) and provided to a transmit antenna for transmission via the communication medium.

Although not depicted in FIG. 1, the position of the filter unit 108 and the error DAC 106 can be swapped so that the filter unit 108 can first filter a digital composite signal to yield a spectral image error signal in the digital domain. The error DAC 106 can then convert the spectral image error signal into the analog domain.

Figure 2:
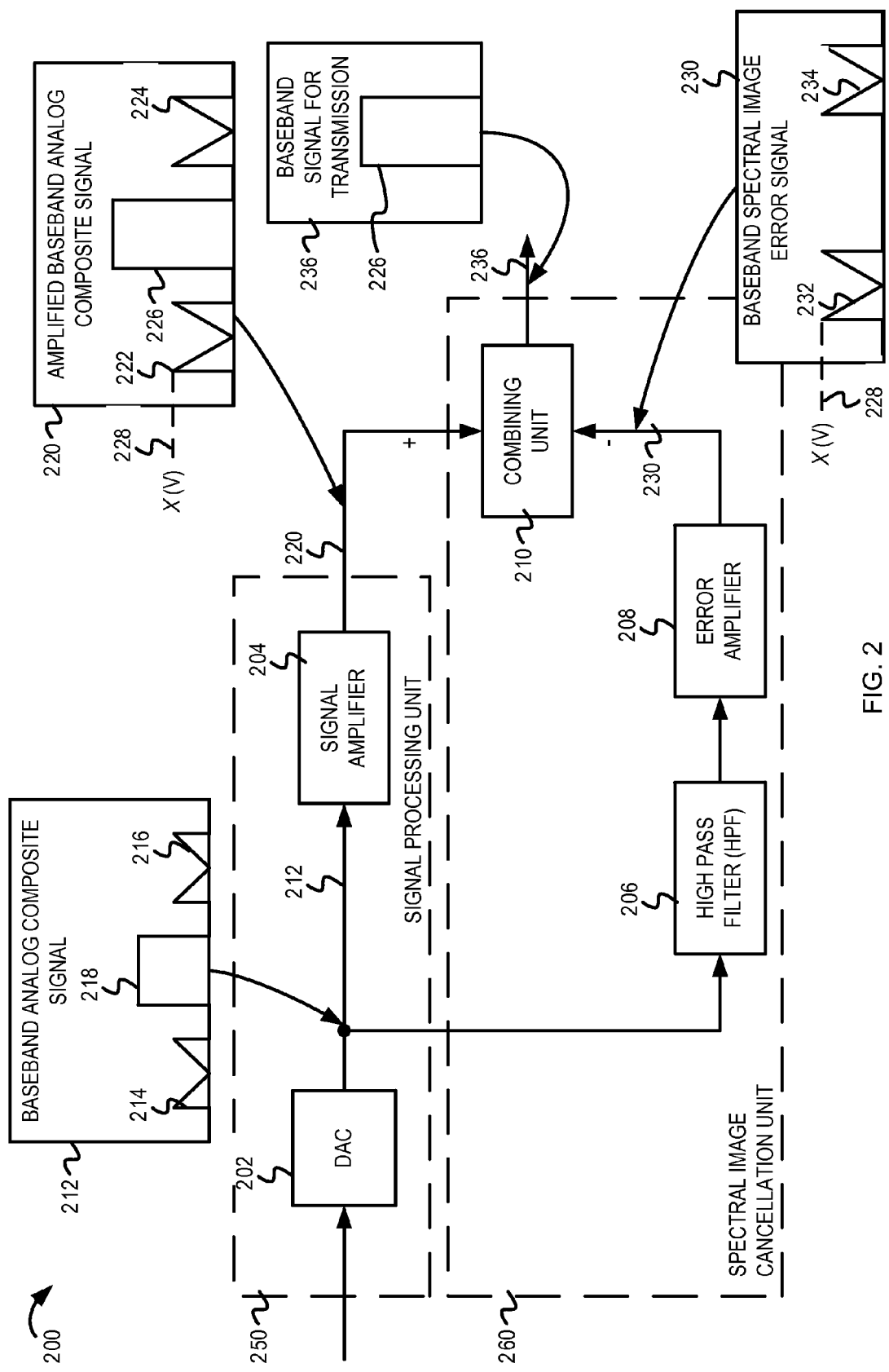
FIG. 2 is an example block diagram illustrating a second embodiment of a mechanism for analog active spectral image cancellation.

FIG. 2 is an example block diagram illustrating a second embodiment of a mechanism for analog active spectral image cancellation. FIG. 2 depicts a communication device 200 comprising a signal processing unit 250 and a spectral image cancellation unit 260. The signal processing unit 250 comprises a DAC 202 and a signal amplifier 204. The spectral image cancellation unit 260 comprises an HPF 206, an error amplifier 208, and a combining unit 210. In FIG. 2, the DAC 202 is coupled with the signal amplifier 204 and with the HPF 206. The HPF 206 is coupled with the error amplifier 208. Finally, the output of the signal amplifier 204 and the output of the error amplifier 208 are provided to the combining unit 210.

In FIG. 2, a baseband digital input signal that is to be transmitted is provided as an input to the DAC 202. In some implementations, the signal processing unit 250 can comprise one or more other processing components such as encoding units, signal filters, etc., to pre-process the baseband digital input signal before providing the baseband digital input signal to the DAC 202. The DAC 202 converts the baseband digital input signal into a corresponding baseband analog composite signal 212 comprising the baseband transmission signal component 218 (i.e., the desired signal component) and baseband spectral image signal components 214 and 216 (i.e., the unwanted spectral images). The baseband analog composite signal 212 is then provided to the signal amplifier 204. In one implementation, the signal amplifier 204 may be a power amplifier that amplifies the baseband analog composite signal 212 by a predetermined amplification factor to yield an amplified baseband analog composite signal 220. The amplified baseband analog composite signal 220 can comprise the amplified baseband transmission signal component 226 at the corresponding amplitude and the amplified spectral image signal components 222 and 224 at the amplitude level of X (Volts) 228.

To minimize/cancel the RF spectral image signal components 222 and 224 in the amplified baseband analog composite signal 220, the baseband analog composite signal 212 at the output of the DAC 202 is also provided to the spectral image cancellation unit 260. The HPF 206 of the spectral image cancellation unit 260 can filter out the baseband transmission signal component 218 and the error amplifier 208 can amplify the resultant signal to yield the baseband spectral image error signal 230. In one implementation, the amplification factor associated with the error amplifier 208 can be predetermined based on the amplification factor of the signal amplifier 204 and based on the attenuation or amplification introduced by other processing components prior to the error amplifier 208 (e.g., the HPF 206). In another implementation, the amplification factor of the error amplifier 208 can be statically or dynamically calibrated (as will be described in FIG. 5) and can be varied accordingly. In one implementation, the amplitude of the spectral images 232 and 234 in the baseband spectral image error signal 230 can be adjusted to be approximately equal to the amplitude of the amplified baseband spectral image signal components 222 and 224 in the baseband analog composite signal. As depicted in FIG. 2, the baseband spectral image error signal 230 comprises the spectral images 232 and 234 at (or approximately at) an amplitude level of X (Volts) 228.

The amplified baseband analog composite signal 220 and the baseband spectral image error signal 230 are then provided to the combining unit 210. As described above, the combining unit 210 can subtract the baseband spectral image error signal 230 from the amplified baseband analog composite signal 220 to minimize (or remove) the baseband spectral image signal components 222 and 224 and to yield the output baseband transmit signal 236. In one example, as depicted in FIG. 2, the output baseband transmit signal 236 may comprise the amplified baseband transmission signal component 226 (i.e., the desired signal component) and may not comprise the spectral image signal components 222 and 224. However, in other examples, the output baseband transmit signal 236 may comprise the baseband transmission signal component 226 and highly attenuated spectral image signal components. The output baseband transmit signal 236 can be up-converted to the RF domain, amplified (if desired) and provided to a transmit antenna for transmission via the communication medium. Although FIGS. 1 and 2 depict an analog spectral image error signal being generated (e.g., using an HPF), embodiments are not so limited. In other implementations, a digital spectral image signal can be generated for spectral image cancellation, as will be further described below in FIGS. 3A, 3B 4A, and 4B.

Figure 3A:
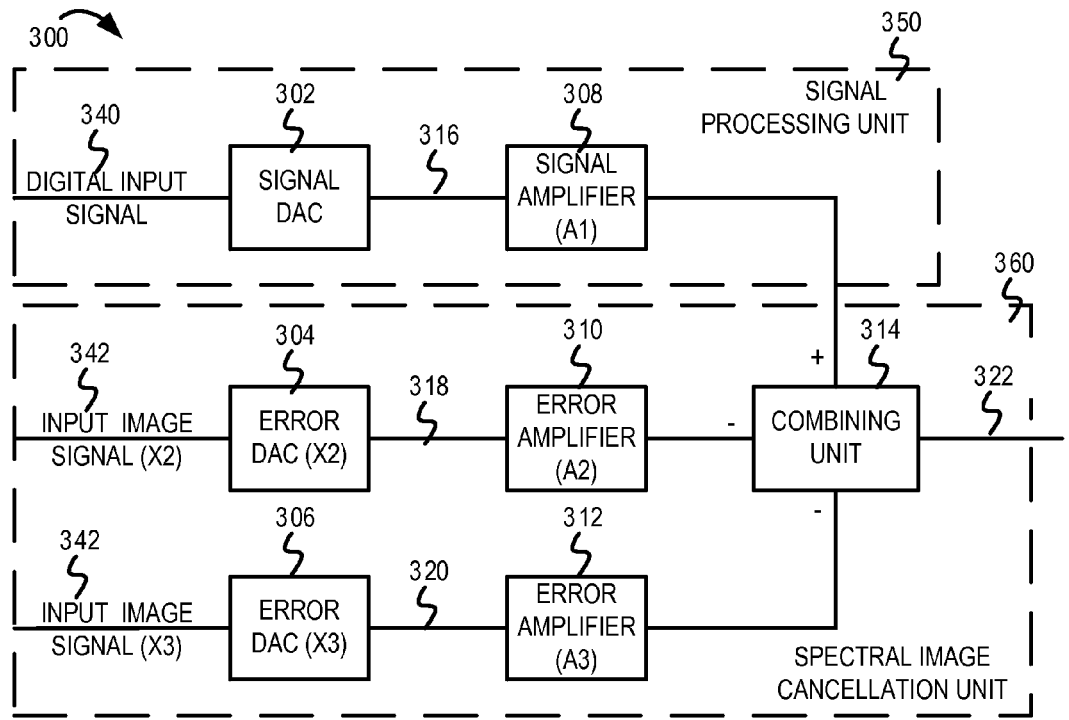
FIG. 3A is an example block diagram illustrating an embodiment of a mechanism for digital active spectral image cancellation using digital-to-analog converters.

FIG. 3A is an example block diagram illustrating an embodiment of a mechanism for digital active spectral image cancellation using digital-to-analog converters. FIG. 3A depicts a communication device 300 comprising a signal processing unit 350 and a spectral image cancellation unit 360. The signal processing unit 350 comprises a signal DAC 302 coupled with a signal amplifier 308. The spectral image cancellation unit 360 comprises error DACs 304 and 306 coupled with error amplifiers 310 and 312, respectively. The spectral image cancellation unit 360 also comprises a combining unit 314. The outputs of the signal amplifier 308 and the error amplifiers 310 and 312 are provided to the combining unit 314.

In FIG. 3A, a baseband digital input signal 340 (at a predetermined sampling frequency) is provided to the signal DAC 302 at the clock frequency. The signal DAC 302 converts the baseband digital input signal 340 into a corresponding baseband analog composite signal 316 comprising the baseband transmission signal component (i.e., the desired signal component) and baseband spectral image signal components at the spectral image frequencies. In the example shown in FIG. 3B, the baseband analog composite signal 316 comprises the baseband transmission signal component 324 centered at DC and several spectral images signal components 326, and 328 at corresponding spectral image frequencies. In this example, the baseband frequency is 80 MHz. Therefore, the spectral image signal component 326 and 328 are generated at 80 MHz (e.g., the baseband frequency) and 160 MHz (e.g., at twice the baseband frequency), respectively. The signal amplifier 308 can then amplify the baseband analog composite signal 316 by a predetermined amplification factor.

The spectral image cancellation unit 360 generates spectral image error signals which can be used to cancel/minimize the spectral image signal components of the signals generated by the signal processing unit 350. Because spectral images are generated at multiples of the clock frequency associated with the communication device 300, the error DACs 304 and 306 operate at multiple times the clock frequency to generate the spectral image error signal. In FIG. 3A, the error DAC 304 operates at twice the clock frequency (e.g., twice the frequency of the signal DAC 302) and the error DAC 306 operates at thrice the clock frequency (e.g., thrice the frequency of the signal DAC 302). The digital input to the error DACs 304 and 306 is the spectral image signal generated from the baseband digital input signal 340. The baseband digital input signal can be processed separately from the functionality shown in FIG. 3A to separately create the digital input image signal. The input image signal 342 is provided to the error DAC 304 that samples that input image signal 342 at twice the sampling frequency. The input image signal 342 is provided to the error DAC 306 that samples that input image signal 342 at thrice the sampling frequency. In FIG. 3A, the error DACs 304 and 306 are represented as error DAC(X2) and error DAC(X3) to indicate the error DACs 304 and 306 operate at twice and at thrice the clock frequency, respectively. Likewise, the inputs to the error DACs 304 and 306 are represented as "input image signal (X2)" and "input image signal (X3)", respectively, to indicate that the inputs provided to the error DAC 304 and 306 are sampled at twice the sampling frequency and at thrice the sampling frequency, respectively. The error DACs 304 and 306 also generate the corresponding baseband spectral image error signals 318 and 320. However, because the error DAC 304 operates at twice the clock frequency (as compared to the signal DAC 302), the baseband spectral image error signal 318 generated at the output of the error DAC 304 comprises spectral image 332 at the baseband frequency (e.g., at the signal DAC's first spectral image frequency of 80 MHz). Also, the error DAC 306 operates at thrice the clock frequency and therefore the baseband spectral image error signal 320 generated at the output of the error DAC 306 comprises spectral images 336 at twice the baseband frequency (e.g., at the signal DAC's second spectral image frequency of 160 MHz) (and at five times the baseband frequency, etc.). The error amplifiers 310 and 312 can then amplify the baseband spectral image error signals 318 and 320, respectively. The amplification factors associated with the error amplifiers 310 and 312 can be predetermined (or calibrated) in accordance with the amplification factor of the signal amplifier 308. In other words, the amplification factors of the error amplifiers 310 and 312 can be selected so that the amplitudes of the spectral image 332 (at the output of the error DAC 304) and the spectral image 336 (at the output of the error DAC 306) are respectively equal to (or approximately equal to) the amplitudes of the spectral images 326, and 328 at the output of the signal amplifier 308.

Figure 3B:
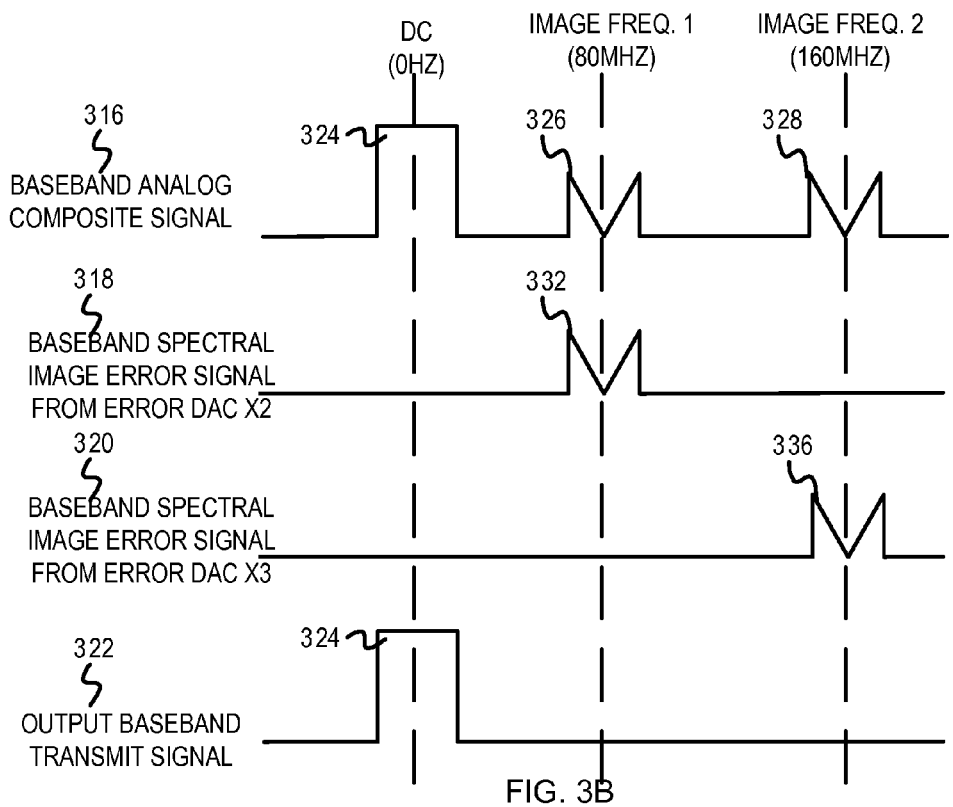
FIG. 3B is an example frequency spectrum at various stages of a digital active spectral image cancellation unit using digital-to-analog converters.

The baseband analog composite signal 316 at the output of the signal amplifier 308 and the baseband spectral image error signals 318 and 320 at the output of the error amplifiers 310 and 312 are provided to the combining unit 314. The combining unit 314 can subtract the spectral image error signals 318 and 320 from the baseband analog composite signal 316 to minimize (or remove) the baseband spectral image signal components 326 and 328 and to yield an output baseband transmit signal 322. In some examples, as depicted in FIG. 3B, the output baseband transmit signal 322 may comprise the baseband transmission signal component 324 (i.e., the desired signal component) and may not comprise any spectral image signal components 326 and 328. However, in other examples, the output baseband transmit signal 322 may comprise the baseband transmission signal component 324 and highly attenuated spectral image signal components. The output baseband transmit signal 322 can be further up-converted to the RF domain, amplified (if desired), and provided to a transmit antenna for transmission via the communication medium. It is noted that, in some implementations, the functionality of the error DACs 304 and 306 and the input image signal can be combined in one high frequency DAC. The high frequency DAC can be configured to operate at thrice the clock frequency of the signal DAC 302.

In some implementations, as will be described below in FIGS. 4A and 4B, the spectral images can be generated at DC and mixer units can be used to up-convert the generated spectral images to the desired spectral image frequencies.

Figure 4A:
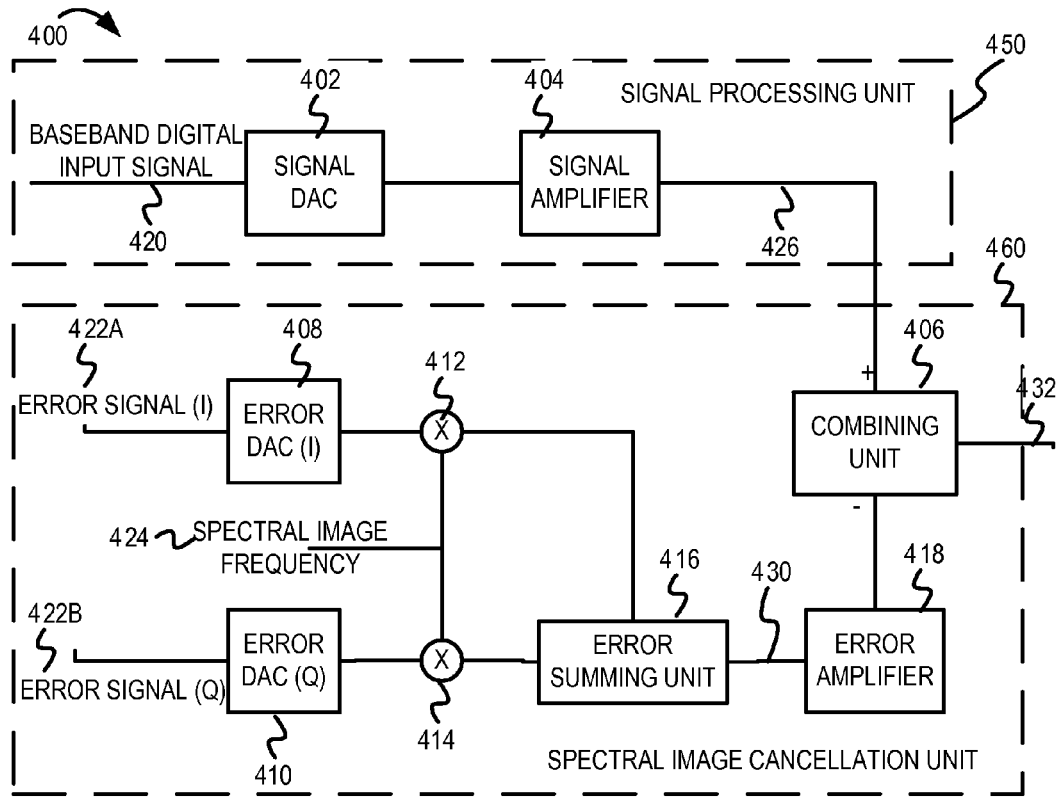
FIG. 4A is an example block diagram illustrating an embodiment of a mechanism for digital active spectral image cancellation using mixers.

FIG. 4A is an example block diagram illustrating an embodiment of a mechanism for digital active spectral image cancellation using mixers. FIG. 4A depicts a communication device 400 comprising a signal processing unit 450 and a spectral image cancellation unit 460. The signal processing unit 450 comprises a signal DAC 402 coupled with a signal amplifier 404. The spectral image cancellation unit 460 comprises an I-error signal DAC 408 and a Q-error signal DAC 410. The I-error signal DAC 408 and the Q-error signal DAC 410 are coupled with mixer units 412 and 414, respectively. The mixer units 412 and 414 are coupled with an error summing unit 416 which, in turn, is coupled with an error amplifier 418. The error amplifier 418 and the signal amplifier 404 are coupled with a combining unit 406.

In FIG. 4A, a baseband digital input signal 420 that is to be transmitted is provided to the signal DAC 402. The signal DAC 402 converts the baseband digital input signal 420 into a corresponding baseband analog composite signal 426 comprising the baseband transmission signal component 434 (i.e., the desired signal component) and baseband spectral image signal component 436. As depicted in FIG. 4B, the baseband analog composite signal 426 generated at the output of the signal DAC 402 comprises the baseband transmission signal component 434 centered at DC (i.e., 0 Hz) and the baseband spectral image signal component 436 centered at the spectral image frequency. The signal amplifier 404 can then amplify the baseband analog composite signal 426 by a predetermined amplification factor.

The spectral image cancellation unit 460 generates a spectral image error signal which can be used to cancel/minimize the spectral image signal components of the signals generated by the signal processing unit 450. In one example, a baseband spectral image error signal centered at DC can be generated by one or more digital processing units (not shown). The baseband spectral image error signal centered at DC can be split into its constituent in-phase and quadrature components. As depicted in FIG. 4A, the I-component of the digital baseband spectral image error signal 422A and the Q-component of the digital baseband spectral image error signal 422B can be processed separately. The I-component of the digital baseband spectral image error signal 422A can be provided to an I-error signal DAC 408 and the Q-component of the digital baseband spectral image error signal 422B can be provided to the and the Q-error signal DAC 410.

The I-error signal DAC 408 and the Q-error signal DAC 410 convert the I-component 422A and the Q-component 422B of the digital baseband spectral image error signal from the digital domain into the analog domain. The analog baseband spectral image error signal 428 of FIG. 4B depicts a combined output of the error signal DACs 408 and 410, where the spectral image 438 is centered at DC. The I-component and the Q-component of the analog baseband spectral image error signal are provided to the mixer units 412 and 414 respectively. The other input to the mixer units 412 and 414 is the spectral image frequency. The output of the mixer units 412 and 414 is an I-component and a Q-component of the analog baseband spectral image error signal respectively at the spectral image frequency. For example, the I-component 422A and the Q-component 422B of the analog baseband spectral image error signal may be centered at DC (0 Hz) prior to up-conversion. If the baseband frequency is 160 MHz, the spectral image signal component 436 in the baseband analog composite signal 426 (generated by the signal processing unit 450) may be centered at 160 MHz. The spectral image frequency 424 can be adjusted to 160 MHz so that the I-component and the Q-component of the analog baseband spectral image error signal after up-conversion is centered at 160 MHz. The error summing unit 416 can sum the I-component and the Q-component of the analog baseband spectral image error signal after up-conversion to yield an output spectral image error signal, and the error amplifier 418 can amplify the spectral image error signal 430. The output spectral image error signal 430 of FIG. 4B depicts a combined output of the mixer units 412 and 414, where the spectral image 438 is centered at the spectral image frequency. The combining unit 406 can combine the baseband analog composite signal 426 and the output spectral image error signal 430 to yield an output baseband transmit signal 432 (depicted in FIG. 4B).

Figure 4B:
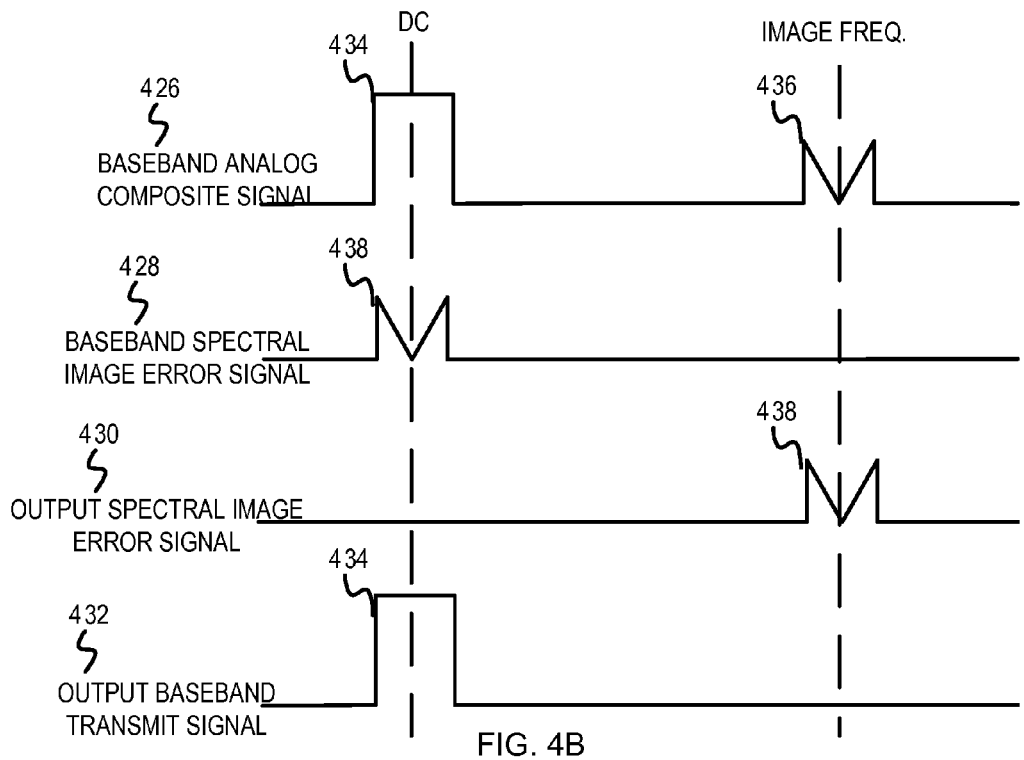
FIG. 4B is an example frequency spectrum at various stages of a digital active spectral image cancellation unit using mixers.

Although not depicted in FIGS. 4A and 4B, it is noted that the error DACs 408 and 410 can also generate their own spectral images in addition to generating spectral images at the image frequencies of the signal DAC 402. Thus, the baseband spectral image error signal 428 and consequently the output baseband transmit signal 432 can comprise spectral images generated by the error DACs 408 and 410. However, the amplitude of the spectral images generated by the error DACs 408 and 410 is typically much smaller (e.g., 50 dB smaller than the baseband transmission signal component 434 generated by the signal DAC 402) because A) spectral images typically have a smaller amplitude than the main signal component, and B) spectral images generated by the error DACs 408 and 410 are images of the image signal which was originally at a smaller amplitude. Likewise, although not depicted in FIGS. 3A and 3B, it is noted that the error DACs 304 and 306 can also generate their own spectral images in addition to generating spectral images at the image frequencies of the signal DAC 302. However, as described above, because the amplitude of the spectral images generated by the error DACs 304 and 306 is typically much smaller (e.g., 50 dB smaller than the baseband transmission signal component 324 generated by the signal DAC 302), the spectral images generated by the error DACs 304 and 306 can typically be tolerated.

Figure 5:
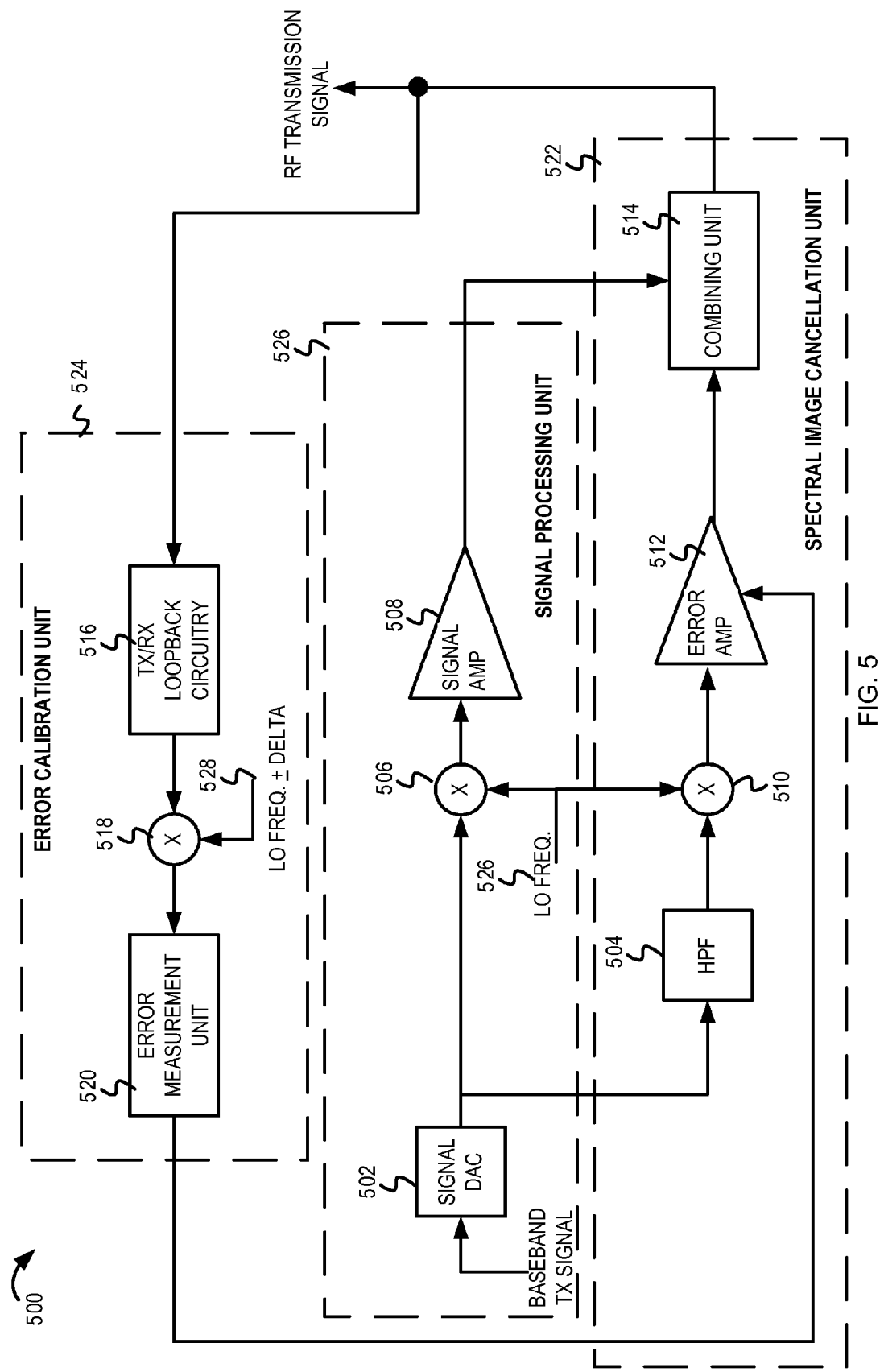
FIG. 5 is an example block diagram illustrating spectral image cancellation using spectral image calibration.

FIG. 5 is an example block diagram illustrating spectral image cancellation using spectral image calibration. A feedback-loop calibration mechanism (as depicted in FIG. 5) can be implemented to try to ensure that the spectral images generated in the "signal path" are cancelled or that the amplitude of the spectral images is minimized in compliance with the spectral mask and constraints on out-of-band emissions set by the FCC. FIG. 5 depicts a communication device 500 comprising a spectral image cancellation unit 522, an error calibration unit 524, and a signal processing unit 526. The signal processing unit 526 comprises a signal DAC 502, a signal mixer unit 506, and a signal amplifier 508. The signal DAC 502 is coupled with the signal mixer unit 506, and the signal mixer unit 506 is coupled with the signal amplifier 508. The spectral image cancellation unit 522 comprises an HPF 504, an error mixer unit 510, an error amplifier 512, and a combining unit 514. The HPF 504 is coupled with the signal DAC 502 of the signal processing unit 526. The HPF 504 is also coupled with the error mixer unit 510, and the error mixer unit 510 is coupled with the error amplifier 512. The signal amplifier 508 and the error amplifier 512 are coupled with the combining unit 514. Furthermore, the output of the combining unit 514 is provided as an input to the error calibration unit 524. The error calibration unit 524 comprises TX/RX loopback circuitry 516 that is coupled with a calibration mixer unit 518. The calibration mixer unit 518 is coupled with an error measurement unit 520. The error measurement unit 520 is coupled with the error amplifier 512 of the spectral image cancellation unit 522.

A baseband input digital signal that is to be transmitted is provided to the signal DAC 502. As described above in FIG. 2, the signal DAC 502 converts the baseband digital input signal into a corresponding baseband analog composite signal comprising the baseband transmission signal component and the baseband spectral image signal components. The signal mixer unit 506 receives the baseband analog composite signal and a local oscillator frequency 526 (e.g., a 5 GHz frequency signal) and generates an RF analog composite signal, centered at the local oscillator frequency 526. The signal amplifier 508 then amplifies the RF analog composite signal by a predetermined amplification factor. At the spectral image cancellation unit 522, the HPF 504 also receives the baseband analog composite signal and filters out the baseband transmission signal component to yield the baseband spectral image error signal (that may only comprise the spectral images). The error mixer unit 510 receives the baseband spectral image error signal and the local oscillator frequency 526 (e.g., the 5 GHz frequency signal) and generates an RF spectral image error signal. It is noted that the RF spectral image error signal comprises the spectral images centered at an offset of the local oscillator frequency 526. For example, if the baseband frequency is 160 MHz and if the local oscillator frequency 526 is 5 GHz, the spectral images in the RF spectral image error signal are centered at 5.16 GHz. The error amplifier 512 amplifies the RF spectral image error signal by an amplification factor that is determined by the error calibration unit 524 (further described below). The outputs of the signal amplifier 508 and the error amplifier 512 are provided to the combining unit 514.

To determine the amplification factor of the error amplifier 512, the RF transmission signal (at the output of the combining unit 514) is provided as an input to the TX/RX loopback circuitry 516 of the error calibration unit 524. The TX/RX loopback circuitry 516 can comprise filtering units, waveform shaping units, and other processing units that simulate the transmission and subsequent reception of the RF transmission signal. The calibration mixer unit 518 receives the RF transmission signal and a local oscillator frequency 528. As described above, the spectral image signal component in the RF analog composite signal are generated at an offset of the local oscillator frequency 526. In one example, the error calibration unit 522 can shift the spectral image signal component to DC (0 Hz) to simplify the calibration procedure. Referring to the above example, the spectral image signal components are centered at an RF frequency of 5.16 GHz when the local oscillator frequency 526 is 5 GHz and the baseband frequency is 160 MHz. In this example, the local oscillator frequency 528 provided as an input to the calibration mixer unit 518 can be 5.16 GHz so that the spectral image signal components are shifted to DC at the output of the calibration mixer 518. It is noted that in other implementations, the spectral images signal components may not be shifted to DC. Instead, the spectral image signal components may be processed in the RF domain or may be down-converted to an intermediate (non-DC) frequency. The error measurement unit 520 can measure the amplitude of the spectral image signal components at the output of the calibration mixer unit 518 and can accordingly determine the amplification factor of the error amplifier 512. The error measurement unit 520 can provide an indication of the amplification factor to the error amplifier 512. For example, the error measurement unit 520 can provide one or more control signals to set the amplification factor of the error amplifier 512. In some implementations, the error amplifier 512 can be associated with an initial amplification factor (e.g., based on historical analysis, simulations, etc.). The error calibration unit 524 can analyze the RF transmission signal (as described above) to determine a more accurate estimate of the amplification factor of the error amplifier 512. The output of the error measurement unit 520 can serve to fine tune the amplification factor of the error amplifier 512 to ensure that the amplitude of the spectral images at the output of the combining unit 514 decreases at each iteration.

Figure 6:
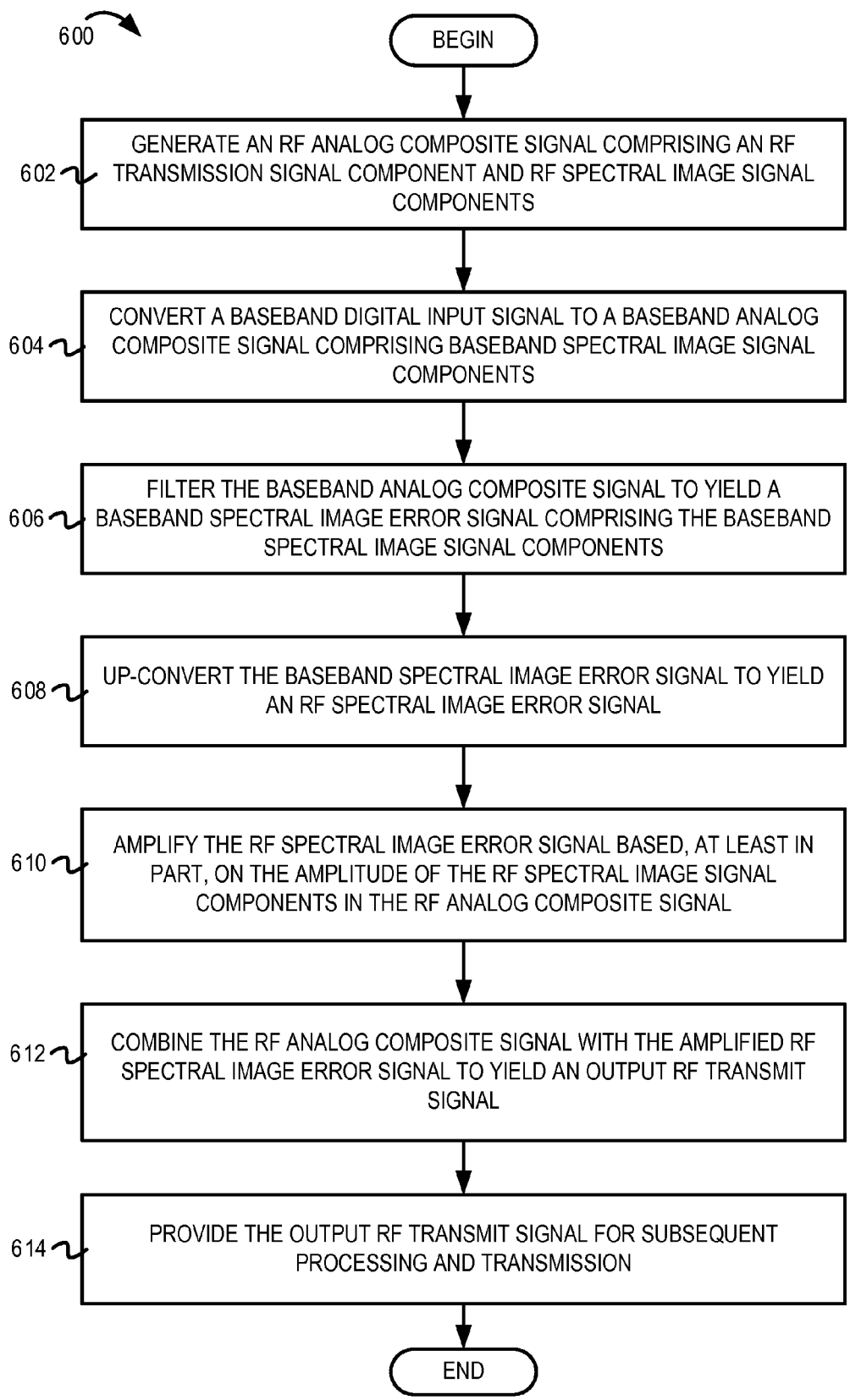
FIG. 6 is a flow diagram illustrating example operations of a mechanism for spectral image cancellation.

FIG. 6 is a flow diagram ("flow") 600 illustrating example operations of a mechanism for spectral image cancellation. The flow 600 begins at block 602.

At block 602, a RF analog composite signal comprising an RF transmission signal component and RF spectral image signal components is generated. As described above, the spectral images are typically generated as a result of digital-to-analog conversion of a digital input signal. Referring to the example of FIG. 1, the digitally modulated PA 104 can generate the RF analog composite signal 126 comprising the RF transmission signal component 128 and the RF spectral image signal components 130 and 132. The flow continues at block 604.

At block 604, a baseband digital input signal is converted to a baseband analog composite signal comprising superimposed baseband spectral image signal components. For example, the error DAC 106 of FIG. 1 can convert the baseband digital input signal 140 into the baseband analog composite signal 142 comprising the baseband transmission signal component 144 (i.e., the desired signal component at baseband) and the baseband spectral image signal components 146 and 148. The flow continues at block 606.

At block 606, the baseband analog composite signal is filtered to yield a baseband spectral image error signal comprising the baseband spectral image signal components. For example, the filter unit 108 (e.g., a HPF) can receive the baseband analog composite signal 142, filter out the baseband transmission signal component 144, and generate the baseband spectral image error signal 150 comprising the baseband spectral image signal components 146 and 148. The flow continues at block 608.

At block 608, the baseband spectral image error signal is up-converted to yield an RF spectral image error signal. For example, the mixer unit 110 can receive the baseband spectral image error signal 150 and a local oscillator frequency as inputs. The mixer unit 110 can then up-convert the baseband spectral image error signal 150 to yield the RF spectral image error signal 152. The flow continues at block 610.

At block 610, the RF spectral image error signal is amplified based, at least in part, on the amplitude of the RF spectral image signal components in the RF analog composite signal. For example, the error amplifier 112 can amplify the RF spectral image error signal. The amplification factor of the error amplifier 112 can be calibrated (as described in FIG. 5) or can be pre-determined based, at least in part, on the leftover amplitude of the RF spectral image signal components 130 and 132 in the output RF transmit signal 134 at the output of the combing unit 114. The flow continues at block 612.

At block 612, the RF analog composite signal is combined with the amplified RF spectral image error signal to yield an output RF transmit signal. For example, the combining unit 114 can subtract the amplified RF spectral image error signal 152 from the RF analog composite signal to minimize the spectral images signal components 130 and 132 in the output RF transmit signal 134. In on example, the output RF transmit signal 134 may comprise the RF transmission signal component 128 and may not comprise any spectral image signal components 130 and 132. In other examples, in addition to the RF transmission signal component 128, the output RF transmit signal 134 may also comprise highly attenuated spectral image signal components 130 and 132. The flow continues at block 614.

At block 614, the output RF transmit signal is provided for subsequent processing and transmission. For example, the output RF transmit signal 134 can be further amplified (if desired) and provided to a transmit antenna for transmission via the communication medium. From block 614, the flow ends.

It should be understood that FIGS. 1-6 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. For example, although FIG. 6 described operations for cancelling/minimizing the spectral image signal components in the RF domain, embodiments are not so limited. In other embodiments (as depicted in FIGS. 2-5), the spectral images can be cancelled/minimized from the baseband analog composite signal and the resultant output baseband transmit signal can then be up-converted to yield the output RF transmit signal.

Although FIG. 4A depicts the spectral image cancellation unit 460 being implemented to cancel spectral image signal components generated by a signal DAC 402, embodiments are not so limited. In other embodiments, the spectral image cancellation unit 460 can be employed to cancel the spectral image signal components generated by a digitally modulated PA. The I-component and the Q-component of the analog baseband spectral image error signal at the output of the I-signal DAC 408 and the Q-signal DAC 410 respectively can be up-converted to the RF domain and can subtracted from the RF analog composite signal at the output of the digitally modulated amplifier. In other words, the spectral image error signal can be generated in baseband, mixed with a phase-modulated local oscillator signal to up-convert the baseband spectral image error signal to the RF domain, and subtracted from the RF analog composite signal at the output of the signal processing unit 450. Furthermore, although FIG. 4A depicts the I-component and the Q-component of the analog baseband spectral image error signal being summed prior to amplification by the error amplifier 418, embodiments are not so limited. In other embodiments, an I-signal error amplifier and a Q-signal error amplifier can be implemented to separately amplify the I-component and the Q-component of the analog baseband spectral image error signal respectively. The I-component and the Q-component of the analog baseband spectral image error signal can then be combined after amplification.

Although not depicted in FIG. 5, in some implementations, the error measurement unit 520 can also implement functionality to estimate the phase and timing associated with the RF analog composite signal received via the loopback path. The error measurement unit 520 can then provide an indication of the appropriate phase of the spectral image error signal. For example, the error measurement unit 520 can provide one or more control signals to set the phase of the error amplifier 512. As another example, the error measurement unit 520 can provide an indication of the estimated phase and timing to a phase compensation unit (e.g., coupled at the output of the error amplifier 512). Furthermore, in some implementations, the operations of the error calibration unit 524 can be executed (e.g., the amplification factor of the error amplifier 512 can be calibrated) at periodic intervals. In another implementation, the operations of the error calibration unit 524 can be executed on a continuous basis. Also, the amplification factor of the error amplifier 512 can be statically (e.g., by transmitting a training signal through the loopback circuitry 516) or dynamically calibrated.

Although the FIGS. 1-6 describe techniques for cancelling spectral images generated at the output of a digitally modulated PA and/or a DAC, embodiments are not so limited. In other embodiments, the techniques for cancelling spectral images can be extended to correct other non-linearities and spurious signals that may be generated by the signal processing unit. For example, the operations of FIGS. 1-6 can be implemented for spur cancellation, to remove non-linearities introduced by line drivers, etc. Furthermore, in addition to digitally modulated power amplifiers and DACs, the techniques of FIGS. 1-6 can be extended for other digital-to-analog conversion devices.

Lastly, it is noted that in some implementations, the signal amplifier (e.g., the signal amplifier 508) and/or the error amplifier (e.g., the error amplifier 510) may be linear amplifiers. In other implementations, the signal amplifier and/or the error amplifier can be non-linear power amplifiers. In other implementations, the signal amplifier and/or the error amplifier can be digitally modulated power amplifiers. In this implementation, the output of the digitally modulated signal (or error) power amplifier can be further processed (as described above in FIG. 1) to minimize the spectral images. Multiple layers of spectral image cancellation can be implemented (e.g., by implementing digitally modulated amplifiers and corresponding spectral image cancellation circuitry) until the spectral images in the RF transmission signal are sufficiently below the constraints set by the FCC.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
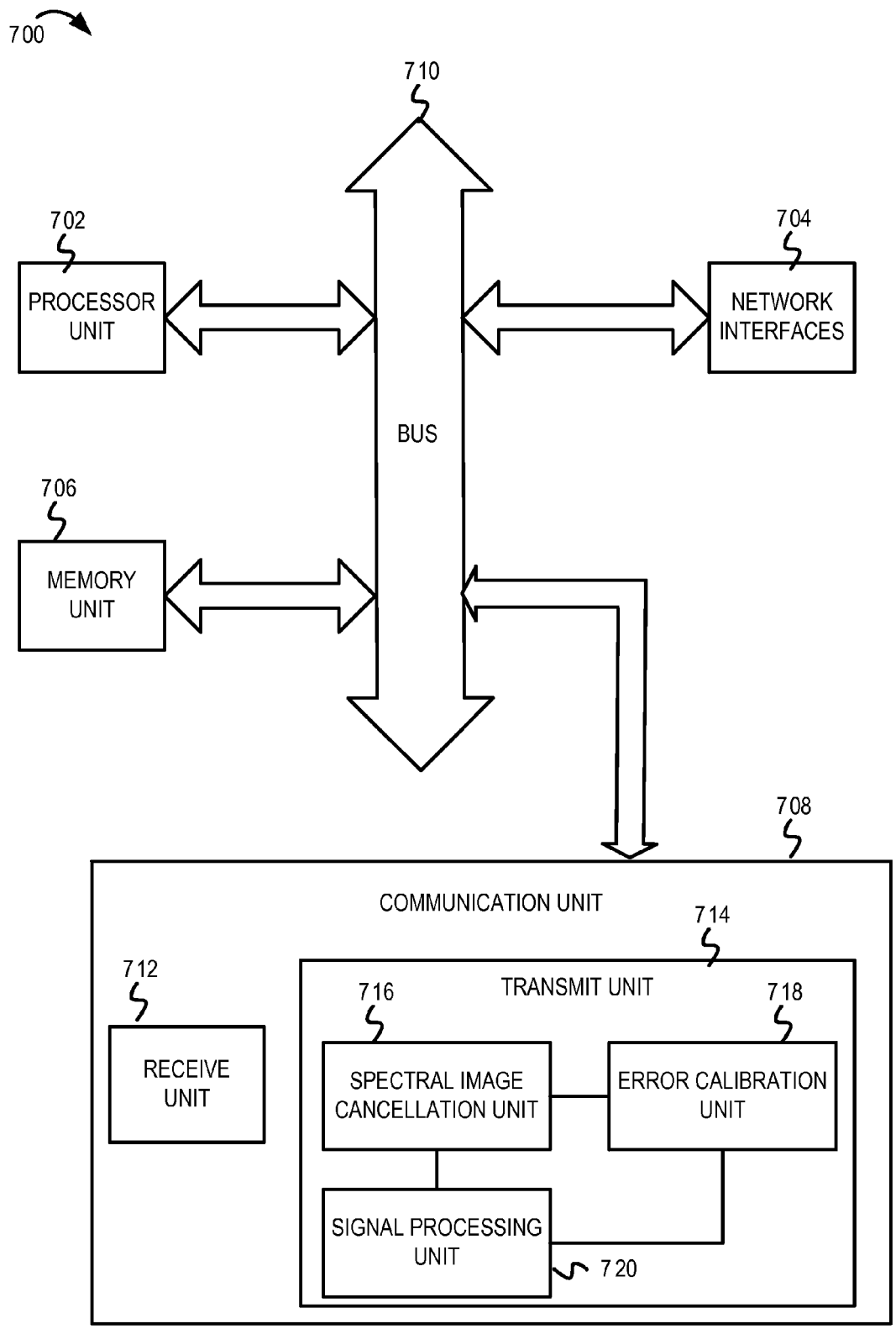
FIG. 7 is a block diagram of one embodiment of an electronic device including a mechanism for spectral image cancellation.

FIG. 7 is a block diagram of one embodiment of an electronic device 700 including a mechanism for spectral image cancellation. In some implementations, the electronic device 700 may be one of a personal computer (PC), a notebook computer, a tablet computer, a netbook, a mobile phone, a gaming console, a mobile phone, a personal digital assistant (PDA), a smart appliance, an access point, or other electronic devices configured to exchange communications with other electronic devices via a communication medium. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an ATM interface, an Ethernet interface, a Frame Relay interface, SONET interface, etc.).

The electronic device 700 also comprises a communication unit 708. The communication unit 708 comprises a transmit unit 714 and a receive unit 712. The transmit unit 714 comprises a spectral image cancellation unit 716, an error calibration unit 718, and a signal processing unit 720. As described in FIG. 5, the error calibration unit 718 can implement functionality to determine one or more parameters (e.g., amplitude, phase, etc.) associated with the spectral image signal components and to consequently determine an amplification factor (and/or a phase correction factor) associated with the spectral image cancellation unit 716. The spectral image cancellation unit 716 can implement functionality to cancel (or minimize) spectral image signal components generated by the signal processing unit 720, as described above in FIGS. 1-6.

Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 706 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for active cancellation of spectral images in communication devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. An apparatus comprising:
   a digital-to-analog conversion unit operable to:
      generate a radio frequency (RF) analog composite signal comprising an RF transmission signal component and a superimposed RF spectral image signal component;
   a spectral image cancellation unit coupled with the digital-to-analog conversion unit, the spectral image cancellation unit operable to:
      generate a baseband analog composite signal comprising a baseband transmission signal component and a superimposed baseband spectral image signal component;
      filter the baseband analog composite signal to yield a baseband spectral image signal;
      up-convert the baseband spectral image signal in accordance with a predetermined carrier signal to yield an RF spectral image signal; and
      subtract the RF spectral image signal from the RF analog composite signal generated by the digital-to-analog conversion unit to reduce the superimposed RF spectral image signal component associated with the RF analog composite signal and generate an output RF transmission signal; and
   an error calibration unit coupled with the spectral image cancellation unit, the error calibration unit operable to:
      down-convert the RF transmission signal in accordance with a first predetermined local oscillator frequency, wherein the first predetermined local oscillator frequency is different from a second predetermined local oscillator frequency associated with the RF transmission signal; and
      determine an error amplification factor for amplifying the RF spectral image signal based, at least in part, on an amplitude of the down-converted superimposed RF spectral image signal component.

2. The apparatus of claim 1, wherein the digital-to-analog conversion unit comprises a digitally modulated power amplifier and wherein the digital-to-analog conversion unit operable to generate the RF analog composite signal comprises the digitally modulated power amplifier operable to:
   generate the RF analog composite signal comprising the RF transmission signal component and the superimposed RF spectral image signal component based on a digital baseband signal comprising information to be transmitted; and
   amplify the RF analog composite signal in accordance with a predetermined signal amplification factor.

3. The apparatus of claim 1, wherein the spectral image cancellation unit comprises:

an error digital-to-analog conversion unit operable to generate the baseband analog composite signal comprising the baseband transmission signal component and the superimposed baseband spectral image signal component based on a digital baseband signal comprising information to be transmitted;
a filter unit coupled with the error digital-to-analog conversion unit, the filter unit operable to filter the baseband analog composite signal to yield the baseband spectral image signal;
a mixer unit coupled with the filter unit, the mixer unit operable to up-convert the baseband spectral image signal in accordance with the predetermined carrier signal to yield the RF spectral image signal;
an error amplifier unit coupled with the mixer unit, the error amplifier unit operable to amplify the RF spectral image signal in accordance with the error amplification factor that is based, at least in part, on a predetermined amplification factor associated with the digital-to-analog conversion unit; and
a combining unit coupled with the digital-to-analog conversion unit and with the error amplifier unit, the combining unit operable to subtract the RF spectral image signal from the RF analog composite signal generated by the digital-to-analog conversion unit to reduce the superimposed RF spectral image signal component associated with the RF analog composite signal and generate the output RF transmission signal.

4. The apparatus of claim 3, further comprising the error calibration unit operable to:
   provide an indication of the error amplification factor to the error amplifier unit.

5. An apparatus comprising:
   a digital-to-analog conversion unit operable to:
      generate a baseband analog composite signal comprising a baseband transmission signal component and a superimposed baseband spectral image signal component;
   a signal amplifier coupled with the digital-to-analog conversion unit, the signal amplifier operable to:
      amplify the baseband analog composite signal in accordance with a predetermined signal amplification factor; and
   a spectral image cancellation unit coupled with the digital-to-analog conversion unit and the signal amplifier, the spectral image cancellation unit operable to:
      filter the baseband analog composite signal to yield a baseband spectral image signal;
      amplify the baseband spectral image signal in accordance with a predetermined error amplification factor based, at least in part, on an amplitude of the superimposed baseband spectral image signal component generated by the digital-to-analog conversion unit; and
      subtract the baseband spectral image signal from the baseband analog composite signal received from the signal amplifier to reduce the superimposed baseband spectral image signal component associated with the baseband analog composite signal and generate an output baseband transmission signal.

6. The apparatus of claim 5, wherein the spectral image cancellation unit comprises:
   a filter unit operable to filter the baseband analog composite signal to yield the baseband spectral image signal;
   an error amplifier coupled with the filter unit, the error amplifier operable to amplify the baseband spectral image signal in accordance with the predetermined error amplification factor based, at least in part, on the amplitude of the superimposed baseband spectral image signal component generated by the digital-to-analog conversion unit; and a combining unit coupled with the signal amplifier and the error amplifier, the combining unit operable to subtract the baseband spectral image signal from the baseband analog composite signal received from the signal amplifier to reduce the superimposed baseband spectral image signal component associated with the baseband analog composite signal and generate the output baseband transmission signal.

7. The apparatus of claim 6 further comprising a mixer unit coupled with the combining unit, the mixer unit operable to up-convert the output baseband transmission signal in accordance with a predetermined carrier signal to yield an output RF transmission signal.

8. An apparatus comprising:
a signal processing unit operable to:
generate a baseband analog composite signal comprising a baseband transmission signal component and a superimposed baseband spectral image signal component, wherein the superimposed baseband spectral image signal component is associated with one or more spectral image frequencies; and
a spectral image cancellation unit coupled with the signal processing unit, the spectral image cancellation unit operable to:
for each of the one or more spectral image frequencies associated with the baseband spectral image signal component of the baseband analog composite signal, generate an error signal at the spectral image frequency that comprises a spectral image signal component at the spectral image frequency;
amplify the error signal at the spectral image frequency in accordance with an error amplification factor based, at least in part, on an amplitude of the superimposed baseband spectral image signal component generated by the signal processing unit; and
subtract one or more error signals at the corresponding one or more spectral image frequencies from the baseband analog composite signal generated by the signal processing unit to reduce the superimposed baseband spectral image signal component associated with the baseband analog composite signal and generate an output baseband transmission signal.

9. The apparatus of claim 8, wherein the signal processing unit comprises:
a digital-to-analog conversion unit operable to generate the baseband analog composite signal comprising the baseband transmission signal component and the superimposed baseband spectral image signal component based on an input baseband digital signal comprising information to be transmitted; and
a signal amplifier coupled with the digital-to-analog conversion unit, the signal amplifier operable to amplify the baseband analog composite signal in accordance with a predetermined signal amplification factor.

10. The apparatus of claim 8, wherein the spectral image cancellation unit comprises one or more error digital-to-analog converters, corresponding one or more error amplifiers, and a combining unit, and wherein,
each of the one or more error digital-to-analog converters is operable to generate the error signal at the corresponding spectral image frequency that comprises the spectral image signal component based on an up-sampled input baseband digital signal comprising information to be transmitted;
each of the one or more error amplifiers is operable to amplify the error signal at the corresponding spectral image frequency in accordance with the error amplification factor based, at least in part, on the amplitude of the superimposed baseband spectral image signal component generated by the signal processing unit; and
the combining unit is operable to subtract one or more error signals at the corresponding one or more spectral image frequencies from the baseband analog composite signal generated by the signal processing unit to reduce the superimposed baseband spectral image signal component associated with the baseband analog composite signal and generate an output baseband transmission signal.

11. The apparatus of claim 10, further comprising a signal mixer unit coupled with the combining unit, the signal mixer unit operable to up-convert the output baseband transmission signal in accordance with a predetermined carrier signal to yield an output RF transmission signal.

12. An apparatus comprising:
a signal processing unit operable to:
generate a baseband analog composite signal comprising a baseband transmission signal component and a superimposed baseband spectral image signal component based on an input baseband digital signal comprising information to be transmitted, wherein the superimposed spectral image signal component is at a spectral image frequency; and
a spectral image cancellation unit coupled with the signal processing unit, the spectral image cancellation unit operable to:
generate an analog in-phase spectral image signal component and an analog quadrature spectral image signal component based on the input baseband digital signal comprising information to be transmitted;
up-convert the analog in-phase spectral image signal component and the analog quadrature spectral image signal component in accordance with the spectral image frequency;
combine the up-converted analog in-phase spectral image signal component and the analog quadrature spectral image signal to yield a baseband spectral image signal at the spectral image frequency;
amplify the baseband spectral image signal at the spectral image frequency in accordance with an error amplification factor that is based, at least in part, on a predetermined signal amplification factor associated with the signal processing unit; and
subtract the baseband spectral image signal at the spectral image frequency from the baseband analog composite signal generated by the signal processing unit to generate an output baseband transmission signal.

13. The apparatus of claim 12, wherein the signal processing unit comprises:
a digital-to-analog conversion unit operable to generate the baseband analog composite signal comprising the baseband transmission signal component and the superimposed baseband spectral image signal component; and
a signal amplifier coupled with the digital-to-analog conversion unit, the signal amplifier operable to amplify the baseband analog composite signal in accordance with the predetermined signal amplification factor.

14. The apparatus of claim 12, wherein the spectral image cancellation unit comprises:

an error processing unit operable to:
    generate a digital baseband spectral image signal at a DC frequency; and
    generate a digital in-phase spectral image signal component and a digital quadrature spectral image signal component associated with the digital baseband spectral image signal;
an I-signal error digital-to-analog converter coupled with the error processing unit, the I-signal error digital-to-analog converter operable to:
    generate the analog in-phase spectral image signal component based on the digital in-phase spectral image signal component;
a Q-signal error digital-to-analog converter coupled with the error processing unit, the Q-signal error digital-to-analog converter operable to:
    generate the analog quadrature spectral image signal component based on the digital quadrature spectral image signal component;
an I-signal error mixer unit coupled with the I-signal error digital-to-analog converter, the I-signal error mixer unit operable to:
    up-convert the analog in-phase spectral image signal component in accordance with the spectral image frequency;
a Q-signal error mixer unit coupled with the Q-signal error digital-to-analog converter, the Q-signal error mixer unit operable to:
    up-convert the analog quadrature spectral image signal component in accordance with the spectral image frequency; and
an error summing unit coupled with the I-signal error mixer unit and the Q-signal error mixer unit, the error summing unit operable to:
    combine the up-converted analog in-phase spectral image signal component and the analog quadrature spectral image signal component to yield the baseband spectral image signal at the spectral image frequency.

15. The apparatus of claim 14, wherein the spectral image cancellation unit comprises:
    an error amplifier coupled with the error summing unit, the error amplifier operable to:
        amplify the baseband spectral image signal at the spectral image frequency in accordance with the error amplification factor that is based, at least in part, on the predetermined signal amplification factor associated with the signal processing unit; and
    a combining unit coupled with the error amplifier and the signal processing unit, the combining unit operable to:
        subtract the baseband spectral image signal at the spectral image frequency from the baseband analog composite signal generated by the signal processing unit to reduce the superimposed baseband spectral image signal component associated with the baseband analog composite signal and generate the output baseband transmission signal.

16. The apparatus of claim 15 further comprising a signal mixer unit coupled with the combining unit, the signal mixer unit operable to up-convert the output baseband transmission signal in accordance with a predetermined carrier signal to yield an output RF transmission signal.

17. A method comprising:
    generating a radio frequency (RF) analog composite signal comprising an RF transmission signal component and a superimposed RF spectral image signal component based on a digital baseband signal comprising information to be transmitted;
    generating a baseband analog composite signal comprising a baseband transmission signal component and a superimposed baseband spectral image signal component based on the digital baseband signal comprising information to be transmitted;
    filtering the baseband analog composite signal to yield a baseband spectral image signal;
    up-converting the baseband spectral image signal in accordance with a predetermined carrier signal to yield an RF spectral image signal;
    subtracting the RF spectral image signal from the RF analog composite signal to reduce the superimposed RF spectral image signal component associated with the RF analog composite signal and generate an output RF transmission signal;
    down-converting the RF analog composite signal in accordance with a first predetermined local oscillator frequency, wherein the first predetermined local oscillator frequency is different from a second predetermined local oscillator frequency associated with the RF analog composite signal; and
    determining an error amplification factor for amplifying the RF spectral image signal based, at least in part, on an amplitude of the down-converted superimposed RF spectral image signal component.

18. The method of claim 17, wherein said generating the RF analog composite signal comprising the RF transmission signal component and the superimposed RF spectral image signal component further comprises:
    amplifying the RF analog composite signal in accordance with a predetermined signal amplification factor.

19. The method of claim 17, further comprising:
    amplifying the RF spectral image signal in accordance with an error amplification factor that is based, at least in part, on an amplification factor associated with the superimposed RF spectral image signal component associated with the RF analog composite signal.

* * * * *